Figure 1:
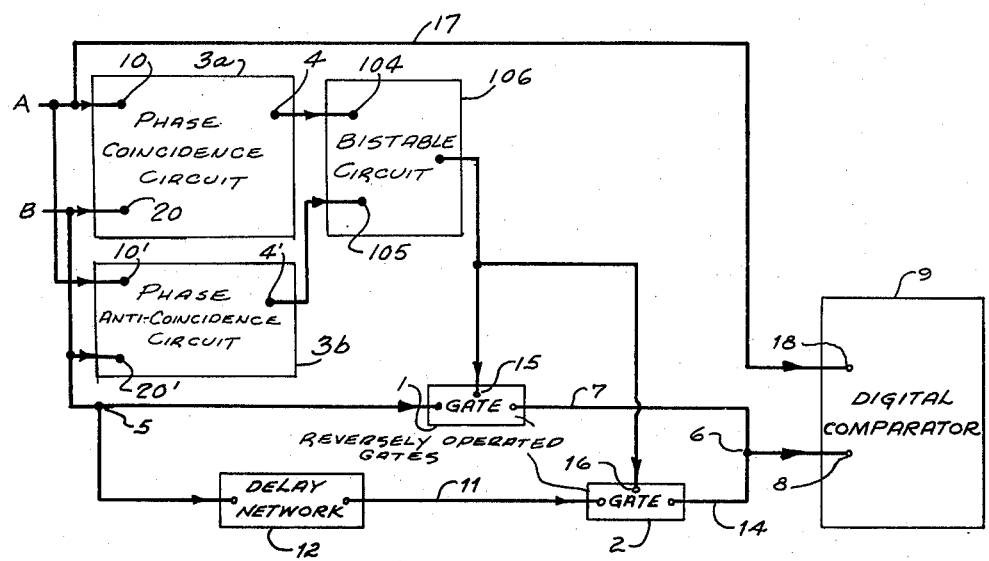

Dec. 23, 1958     C. K. RAYNSFORD     2,866,092
INFORMATION PROCESSING DEVICE

Filed April 27, 1954     2 Sheets-Sheet 1

INVENTOR.
CHARLES K. RAYNSFORD
BY
*Theodore Jay Jr*
ATTORNEY

Dec. 23, 1958  C. K. RAYNSFORD  2,866,092
INFORMATION PROCESSING DEVICE
Filed April 27, 1954  2 Sheets-Sheet 2

INVENTOR.
CHARLES K. RAYNSFORD
BY
ATTORNEY

United States Patent Office 2,866,092
Patented Dec. 23, 1958

2,866,092

INFORMATION PROCESSING DEVICE

Charles K. Raynsford, Summit, N. J., assignor to Vitro Corporation of America, Verona, N. J.

Application April 27, 1954, Serial No. 425,980

9 Claims. (Cl. 250—27)

My invention relates generally to information handling systems wherein information in the form of electrical impulse trains is stored, transferred and processed, and more particularly relates to improved information processing apparatus for use in such systems.

In my copending patent application, S. N. 335,695, filed February 9, 1953, now U. S. Patent No. 2,795,695, I disclosed a digital comparator for comparing the recurrence frequencies of first and second impulse trains to produce output pulses which represent the instantaneous difference between these two recurrence frequencies. This comparator includes a device such as a bi-stable multivibrator which is characterized by two matually exclusive stable electric states and which is provided with two input circuits and an output circuit. The comparator further includes first and second conditionally responsive signal networks such as gates each of which is coupled to the output circuit and conditioned for operation thereby. The input of each gate is coupled to a corresponding input of the device. Each impulse train is supplied to the input of the corresponding gate. The gates are connected so that their actions are opposed; i. e., when one gate is actuated, the other gate is deactuated and vice versa.

Under these conditions, a first pulse from one train urges the device into one electric state and opens but does not pass through the first gate. The second gate is closed at the instant the first gate is opened. Any further pulses from this one train pass through the first gate and appear at the output thereof as long as the device remains in this one state. The first pulse from the other train urges the device into the second state and opens but does not pass through the second gate. The first gate is closed at the instant the second gate is opened. Any further pulses from the other train pass through the second gate and appear at the output thereof as long as the device remains in the other state. Thus, when both sources have the same recurrence frequency, no pulses pass through either gate and the instantaneous difference frequency is zero. When these recurrence frequencies differ, pulses will pass through one of the gates and will represent the pulse difference frequency.

All such devices have a finite resolution interval; and all pulses arriving at the inputs thereto within this interval are considered in phase coincidence. When corresponding pulses arrive at each input in phase coincidence, the operation of the device is erratic and is not predictable.

I have invented an improved phase coincidence circuit arrangement which, when used with any apparatus of the character indicated, allows the apparatus to function properly in this condition of phase coincidence.

Accordingly, it is an object of the present invention to provide a new and improved phase coincidence circuit arrangement of the character indicated.

It is a further object to provide an improved phase coincidence circuit arrangement which senses the instantaneous phase difference between two incoming impulse trains and which introduces an appropriate finite phase shift in one of these trains at instants when there is phase coincidence.

Still a further object is to provide an improved digital comparator which incorporates this phase coincidence circuit arrangement.

Figure 2:
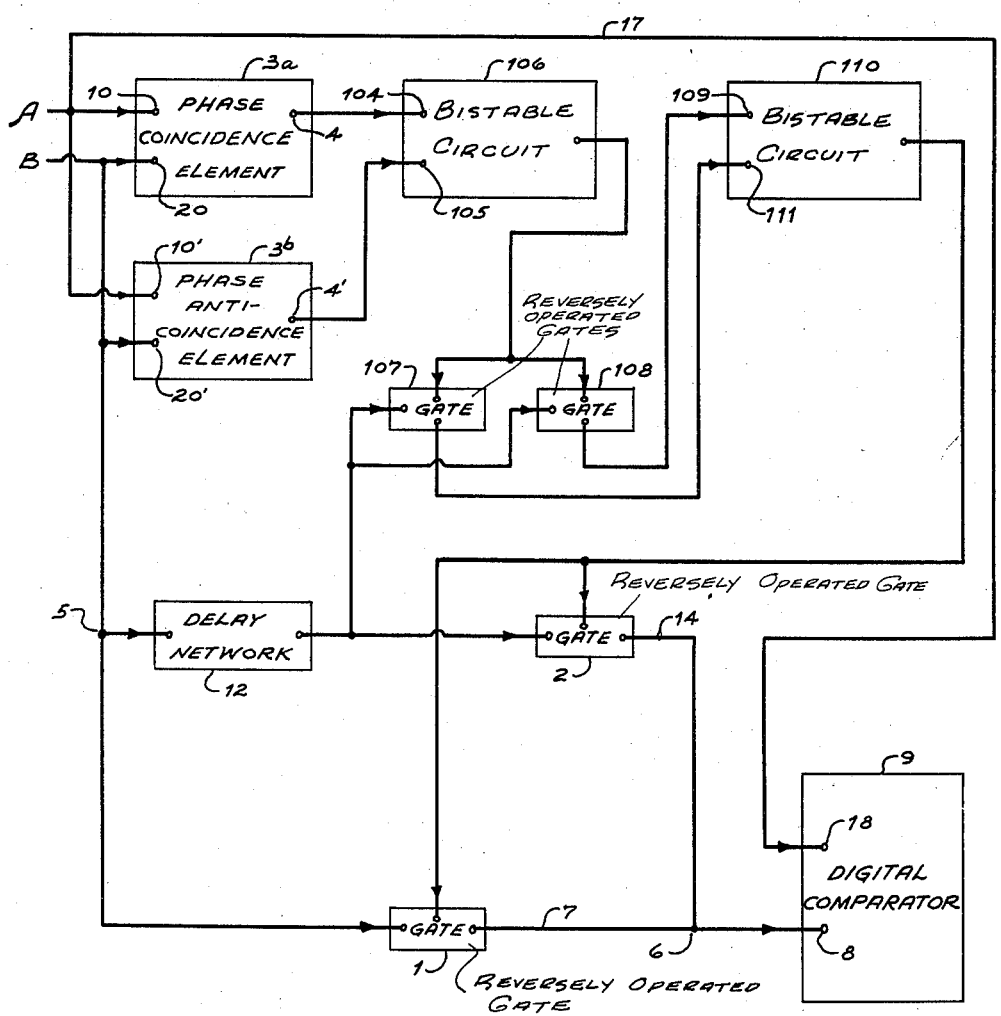

These and other objects of the invention will either be explained or will become apparent to those skilled in the art when this specification is studied in conjunction with the accompanying drawings wherein:

Figure 1 shows in block form the basic invention; and
Figure 2 shows in block form a variant of the basic invention.

Briefly stated, my invention contemplates phase sensing circuits responsive to first and second incoming impulse trains which produce a first output voltage when corresponding pulses in said trains arrive at their input in a first selected phase relation, the phase sensing circuits producing a second output voltage when the corresponding pulses arrive in a second selected phase relation. First and second conditionally responsive signal lines are coupled to the output of the circuits. When the phase sensing circuits yield said first voltage, the first line is actuated and the second line is deactuated; when the second voltage is produced, the first line is deactuated and the second line is actuated. A signal delay network is included in one of said lines.

Referring now to Figure 1, incoming impulse trains A and B are respectively applied to inputs 10 and 20 of phase coincidence circuit 3a and inputs 10' and 20' of phase anticoincidence circuit 3b. When corresponding pulses from these trains arrive in such timing that there is substantial phase coincidence, or that such pulses exhibit at least a predetermined minimum phase relation relative to each other, the coincidence circuit 3a produces output pulses at its output 4 which are coupled to one input 104 of a bistable circuit 106 to provide a first control voltage at its output. When the timing is such that this minimum phase displacement is exceeded, output pulses are produced at output 4' of the anti-coincidence circuit 3b and coupled to another input 105 of the bistable circuit 106 to provide a second control voltage at its output.

The coincidence and anti-coincidence circuits may be of the type described in U. S. Patents No. 2,610,790 to Elliott, for example, and the bistable circuit may be of the type illustrated on page 16 of the text "High-Speed Computing Devices" published by McGraw-Hill Book Company, Inc., in 1950.

A first conditionally responsive signal line 7, which includes gate 1, is connected at its input 5 to inputs 20 and 20' of the phase circuits 3a and 3b, and is connected at its output 6 to input 8 of digital comparator 9. This comparator is of the type previously discussed. A second conditionally responsive signal line 11, which includes a delay network 12 and gate 2, is connected at its input to inputs 20 and 20' of the phase circuits 3a and 3b, and is connected at its output 14 to input 8 of comparator 9. The respective conditioning electrodes 15 and 16 of gates 1 and 2 are connected to the output of the bistable circuit 106. The inputs 10 and 10' of the phase circuits 3a and 3b are connected directly by conductor 17 to input 18 of the comparator 9.

Gates 1 and 2 act in reverse sense; gate 1 is opened and gate 2 is closed when the second control voltage is produced and gate 1 is closed and gate 2 is opened when the first control voltage is produced. Conventional gate circuits can be used for the gates 1 and 2. For example, these gates may consist of diode gates such as shown in the text "Waveforms," volume 19 of the Radiation Laboratory Series, published in 1949 by McGraw-Hill Book Company, Inc., at page 375, Figures 10-11. The gate circuit there shown may be operated by two different control voltages; i. e., positive and negative voltages, and will pass either positive or negative pulses when opened. If the above circuit is used, the first and second control voltages from the bistable circuit 106 are assumed to be positive and negative voltages, respectively, and the gates 1 and 2 will be closed and opened, respectively, by coupling the first control voltage to the plate of $V_1$ in Figures 10-11 (gate 1) and to the cathode of $V_3$ in Figures 10-11 (gate 2) and opened and closed, respectively, by coupling the second control voltage to the same inputs.

Consequently, when the minimum phase displacement between pulses is exceeded (i. e., in accordance with the previous discussion, the condition of normal comparator operation) gate 1 is closed and gate 2 is open and both impulse trains are supplied to the input comparator without change in timing. However, when the phase displacement falls below this minimum (the condition of erratic and unreliable comparator operation), gate 1 is open and gate 2 is closed and pulses in the second train are delayed through action of the network 12 so that the phase displacement between pulse trains is increased to acceptable values before these pulses are supplied to the comparator.

Because of inherent phase discrimination resolution limitations, the above apparatus is frequently inadequate when the instantaneous difference between the pulse train recurrence frequencies is very small relative to the absolute values of these frequencies. Consequent'y, certain pulses may be lost in the gating systems and thus not be transmitted to the comparator. Under these conditions certain modifications must be made as shown in Figure 2.

As before, incoming pulse trains A and B are supplied to corresponding inputs 10 and 20 of the phase coincidence circuit 3a. Under the condition of phase coincidence, the circuit 3a yields an output pulse at output 4. For all other conditions, no output pulses are produced. These trains are likewise supplied to corresponding inputs of the phase anti-coincidence circuit 3b. When corresponding pulses in said trains arrive at these inputs in out-of-phase relation, this circuit yields an output pulse at output 4'. For all other conditions, no output pulses are produced. The outputs of circuits 3a and 3b are connected to the inputs 104 and 105 respectively of the bistable circuit 106.

When a pulse indicative of phase coincidence is supplied to the input 104, the bistable circuit 106 is urged into the "set" state. When a pulse indicative of the absence of phase coincidence is supplied to the input 105, the bistable circuit 106 is urged into the "restore" state.

Pulse train B is applied through delay network 12 to the input of gate 2 and is applied directly to the input of gate 1 in the same manner as before. The delayed pulses, however, are also supplied to the inputs of gates 107 and 108. These gates are reversed in gating action; when the bistable circuit 106 is "set," gate 107 is opened and gate 108 is closed. The action is reversed when the bistable circuit 106 is "restored." The gates 107 and 108 may be similar to the gates 1 and 2 described in connection with Figure 1.

When gate 107 is opened, delayed pulses from pulse train B pass therethrough to the input 111 of a bistable circuit 110 and "set" same. The bistable circuit 110 may comprise a binary counting circuit with two input leads such as shown on page 16 of the above referred to text "High-Speed Computing Devices." When gate 108 is opened, these delayed pulses pass to the input 109 of the bistable circuit 110 and "restore" same. Gates 1 and 2 are conditioned by the conducting state of the bistable circuit 110. When this bistable circuit is in the "restored" state, gate 1 is opened and gate 2 is closed.

This is the condition of pulse anti-coincidence for the incoming pulse trains and pulse trains A and B are supplied without relative delays to the input of comparator 9 in the manner previously described. When this bistable circuit is in the "set" state, gate 2 is opened and gate 1 is closed. This is the condition of pulse coincidence, and the arrival of pulse train B at comparator 9 is delayed relative to pulse train A.

Thus, the action of gates 1 and 2 is always timed in accordance with the delayed pulses of pulse train B and the entire operating sequence is more accurately controllable as compared to the arrangement shown in Figure 1.

While I have described and pointed out various salient features of the invention as illustrated by certain preferred embodiments, other variations within the scope and sphere of the invention will be apparent to those skilled in the art and I desire not to be limited except as in the claims which follow.

I claim:

1. In combination, means responsive to first and second impulse trains to derive first and second control voltages therefrom, said first voltage being derived when corresponding pulses in both trains are in substantial phase coincidence and said second voltage being derived when said corresponding pulses are out of phase with each other; first and second conditionally responsive signal transfer means coupled to an output terminal, each of said transfer means when actuated being operative to transfer only said second impulse train to said output terminal, one of said transfer means including a signal delay network; and means to supply said first and second control voltages to said first and second transfer means, said first control voltage actuating said first transfer means and deactuating said second transfer means and said second control voltage deactuating said first transfer means and actuating said second transfer means.

2. The combination as set forth in claim 1 wherein said signal delay network is included in said first transfer means.

3. In combination, phase sensing circuits responsive to first and second incoming pulse trains to derive therefrom first and second control voltages, said first voltage being derived when corresponding pulses in said train arrive at said circuits in substantial phase coincidence and said second voltage being derived when said corresponding pulses arrive in out of phase relation to each other; first and second conditionally responsive signal lines connected in shunt relation, said first line including a signal delay network; means to supply only said second train to said first and second lines; and means to supply said first and second control voltages to said first and second lines, said first control voltage actuating one of said lines and deactuating the other line and said second control voltage deactuating said one line and actuating said other line.

4. In combination, phase sensing circuits provided with first and second inputs; means to apply first and second incoming pulse trains to said first and second inputs, respectively, said circuits producing a first control voltage indicative of pulses arriving at said first and second inputs in substantial phase coincidence said circuits producing a second control voltage indicative of pulses arriving at said first and second inputs in out of phase relation; first and second gates having opposed gating actions, the outputs of both gates being connected together, the input of said first gate being connected to the second inputs of said circuits; a signal delay network coupled between the second input of said circuits and the input of said second gate, whereby only the second incoming pulse train will pass through the gates; and means to supply said first and second control voltages to said first and second gates, said first control voltage opening said second gate and closing said first gate and said second control voltage closing said second gate and opening said first gate.

5. The combination as set forth in claim 4 further including a digital comparator for comparing the recurrence frequencies of the first and second pulse trains and provided with first and second input connections; means coupling the first input of said circuits to said first input connection; and means coupling the outputs of both gates to said second input connection.

6. In combination, means responsive to first and second incoming pulse trains to derive therefrom first control signals when corresponding pulses in said trains arrive at said means in phase coincidence and second control signals when said pulses arrive in out of phase relation; a first bistable circuit coupled to said means, said first bistable circuit attaining a set state in response to one of said first signals and attaining a restore state in response to one of said second signals; first and second gates having reversed gating actions and coupled to the output of said first bistable circuit, said first gate being opened and said second gate being closed when said first bistable circuit is in said set state, the gating action of both first and second gates being reversed when said first bistable circuit attains said restore state; a pulse delay network; means to supply said second train through said delay network to the inputs of said first and second gates; a second bistable circuit coupled to the output of said first and second gates, said second bistable circuit attaining a set state when pulses pass through said first gate and attaining a restore state when pulses pass through said second gate; third and fourth gates having reversed gating actions and coupled to the output of said second bistable circuit, said third gate being opened and said fourth gate being closed when said second bistable circuit is in said set state, the gating action of said third and fourth gates being reversed when said second bistable circuit is in said restore state, the input of said third gate being coupled to the inputs of said first and second gates; and means to apply said second train to the input of said fourth gate.

7. The combination as set forth in claim 6 further including a digital comparator for comparing the recurrence frequencies of the first and second pulse trains and provided with first and second input connections; means to supply said first train to said first input connection; and means coupling the outputs of said third and fourth gates to the second input connection.

8. In combination, phase coincidence means responsive to first and second incoming pulse trains to derive therefrom first control signals when corresponding pulses in said trains arrive at said coincidence means in phase coincidence; phase anti-coincidence means responsive to said first and second trains to derive therefrom second control signals when said corresponding pulses arrive at said anti-coincidence means in out of phase relation; a first bistable circuit coupled to both of said coincidence and anti-coincidence means, said first bistable circuit attaining a set state in response to one of said first control signals and attaining a restore state in response to one of said second control signals; first and second gates having reversed gating actions and coupled to the output of said first bistable circuit, said first gate being opened and said second gate being closed when said first bistable circuit is in said set state, the gating action of both first and second gates being reversed when said first bistable circuit attains said restore state; a pulse delay network; means to supply said second train through said network to the inputs of said first and second gates; a second bistable circuit coupled to the output of said first and second gates, said second bistable circuit attaining a set state when pulses pass through said first gate and attaining a restore state when pulses pass through said second gate; third and fourth gates having reversed gating actions and coupled to the output of said second bistable circuit, said third gate being opened and said fourth gate being closed when said second bistable circuit is in said set state, the gating action of said third and fourth gates being reversed when said second bistable circuit is in said restore state, the input of said third gate being coupled to the inputs of said first and second gates; and means to apply said second train to the input of said fourth gate.

9. In combination, phase coincidence means responsive to first and second incoming pulse trains to derive therefrom first control signals when corresponding pulses in said trains arrive at said coincidence means in phase coincidence; phase anti-coincidence means responsive to said first and second trains to derive therefrom second control signals when said corresponding pulses arrive at said anti-coincidence means in out of phase relation; a bistable circuit coupled to both said coincidence and anti-coincidence means, said bistable circuit attaining a set state in response to one of said first control signals and attaining a restore state in response to one of said second control signals; first and second conditionally responsive signal transfer means in shunt relation, each of said transfer means when actuated being responsive only to said second train to transfer said second train therethrough, one of said transfer means including a pulse delay network; and means coupling the output of said bistable circuit to said first and second transfer means to actuate one of said transfer means and deactuate the other when said bistable circuit is in the set state, said actuation and deactuation action being reversed when said bistable circuit is in the restore state.

References Cited in the file of this patent

UNITED STATES PATENTS

| | | |
|---|---|---|
| 2,538,027 | Mozley et al. | Jan. 16, 1951 |
| 2,610,790 | Elliott | Sept. 16, 1952 |
| 2,643,820 | Williams et al. | June 30, 1953 |
| 2,646,501 | Eckert et al. | July 21, 1953 |
| 2,673,293 | Eckert et al. | Mar. 23, 1954 |